US012463913B2

(12) United States Patent
Ranjan et al.

(10) Patent No.: US 12,463,913 B2
(45) Date of Patent: Nov. 4, 2025

(54) NETWORK CONGESTION CONTROL

(71) Applicant: Microsoft Technology Licensing, LLC, Redmond, WA (US)

(72) Inventors: Prashant Ranjan, San Jose, CA (US); Abdulkader Kabbani, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 18/315,303

(22) Filed: May 10, 2023

(65) Prior Publication Data

US 2024/0380703 A1 Nov. 14, 2024

(51) Int. Cl.
*H04L 47/27* (2022.01)
*H04L 1/1607* (2023.01)
*H04L 1/1867* (2023.01)
*H04L 47/12* (2022.01)

(52) U.S. Cl.
CPC ............ *H04L 47/27* (2013.01); *H04L 1/1657* (2013.01); *H04L 1/187* (2013.01); *H04L 47/12* (2013.01)

(58) Field of Classification Search
CPC ......... H04L 47/12; H04L 47/27; H04L 1/187; H04L 1/1657
See application file for complete search history.

(56) References Cited

U.S. PATENT DOCUMENTS

| 5,377,327 A | 12/1994 | Jain |
| 6,625,118 B1 | 9/2003 | Hadi Salim et al. |
| 2006/0251010 A1* | 11/2006 | Ramakrishnan ........ H04L 47/27 370/328 |
| 2007/0008884 A1* | 1/2007 | Tang .......................... H04L 9/40 370/230 |
| 2008/0037420 A1* | 2/2008 | Tang ........................ H04L 1/187 370/231 |
| 2014/0153387 A1* | 6/2014 | Wu .......................... H04L 47/36 370/252 |

(Continued)

OTHER PUBLICATIONS

International Search Report and Written Opinion received for PCT Application No. PCT/US2024/026731, Aug. 7, 2024, 15 pages.

*Primary Examiner* — Melanie Jagannathan
(74) *Attorney, Agent, or Firm* — Holzer Patel Drennan

(57) ABSTRACT

Control of congestion in a network between a transmission source and a transmission destination is provided, including receiving, at the transmission source, a packet transmission acknowledgment associated with a transmission packet of a data stream received at a transmission destination, incrementing a first window resize counter based on a congestion indicator, determining that a window resize condition is satisfied based on the incrementing of the first window resize counter and resizing, based on satisfaction of the window resize condition, a transmission window of the data stream. The packet transmission acknowledgment includes the congestion indicator, which represents whether network traffic experienced by the transmission packet between the transmission source and the transmission destination satisfies a congestion condition. The transmission window represents a maximum number of packets permitted to be transmitted from the transmission source and concurrently unacknowledged as received by the transmission destination.

22 Claims, 4 Drawing Sheets

(56) References Cited

U.S. PATENT DOCUMENTS

| | | | |
|---|---|---|---|
| 2017/0180261 A1* | 6/2017 | Ma | H04L 47/12 |
| 2019/0044861 A1 | 2/2019 | Wandler | |
| 2020/0084150 A1* | 3/2020 | Burstein | H04L 47/805 |
| 2021/0297351 A1* | 9/2021 | Vegesna | H04L 49/25 |
| 2023/0016035 A1* | 1/2023 | Mykytianskyi | H04L 63/20 |
| 2023/0216809 A1* | 7/2023 | Tian | H04L 47/27 |
| | | | 709/224 |
| 2023/0327998 A1* | 10/2023 | Shpigelman | H04L 43/106 |

* cited by examiner

NETWORK CONGESTION CONTROL

BACKGROUND

Common data transmission protocols provide for transmitting data in packets. A data packet typically includes a payload, which refers to the portion of the packet with the data to be transmitted, as well as a header that includes metadata describing the routing of the data in the payload. Responsive to the successful transmission of a packet over a network to a transmission destination, the transmission destination responds by transmitting an acknowledgment back to the transmission source. When a data packet in transit experiences congestion between the transmission source and the transmission destination, the congestion is indicated within the corresponding acknowledgment. The acknowledgment, therefore, serves to inform the transmission source of the congestion, providing the transmission source with the option to self-modify its behavior to help mitigate the congestion, such as by self-imposing rules that effectively reduce a packet transmission rate.

SUMMARY

The presently described technology provides control of congestion in a network between a transmission source and a transmission destination by receiving, at the transmission source, a packet transmission acknowledgment associated with a transmission packet of a data stream received at a transmission destination, incrementing a first window resize counter based on a congestion indicator, determining that a window resize condition is satisfied based on the incrementing of the first window resize counter and resizing, based on satisfaction of the window resize condition, a transmission window of the transmission source. The packet transmission acknowledgment includes the congestion indicator, which represents whether network traffic experienced by the transmission packet between the transmission source and the transmission destination satisfies a congestion condition. The transmission window represents a maximum number of packets permitted to be transmitted from the transmission source and concurrently unacknowledged as received by the transmission destination.

This summary is provided to introduce a selection of concepts in a simplified form. The concepts are further described below in the Detailed Description. This summary is not intended to identify key features or essential features of the claimed subject matter, nor is the summary intended to be used to limit the scope of the claimed subject matter.

Other implementations are also described and recited herein.

DETAILED DESCRIPTION

Figure 1:
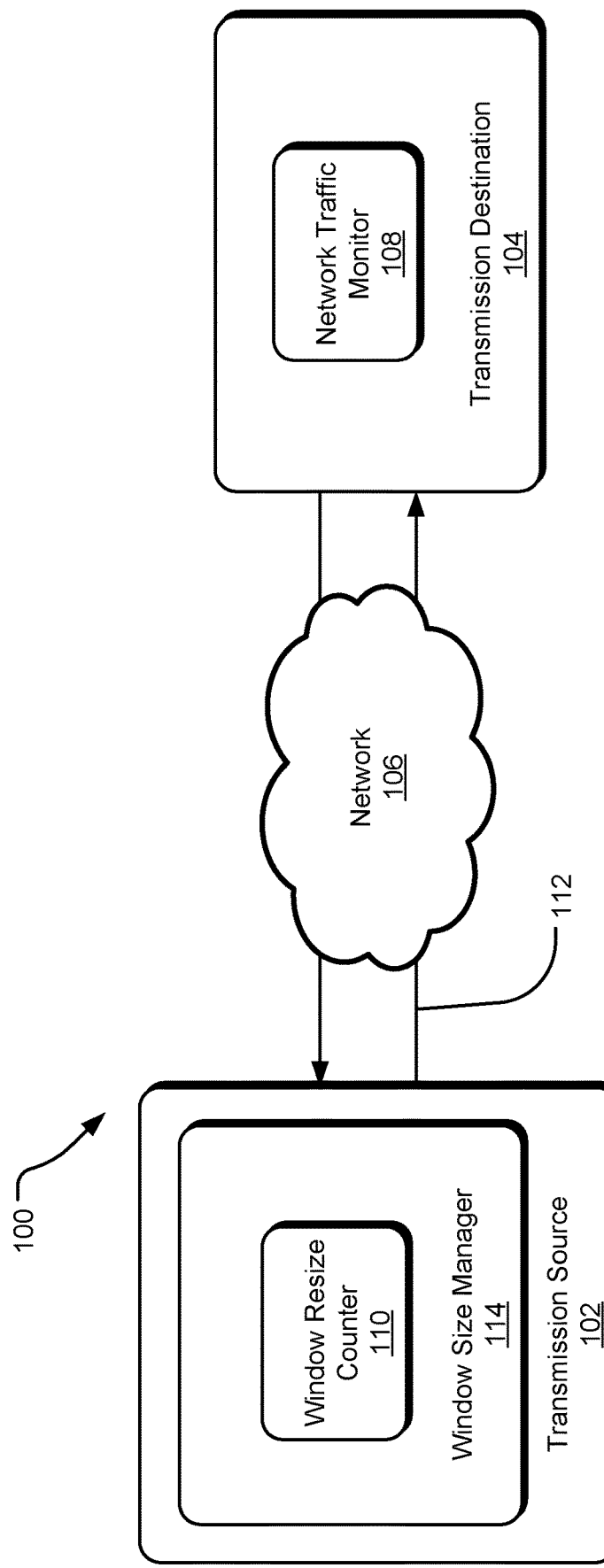
FIG. 1 illustrates an example system for controlling network congestion.

One way a data transmission source can help mitigate network congestion impacting a data stream is to self-impose rules that provide for modifying the size of a "transmission window" for the data stream. The term transmission window refers to a maximum number of packets permitted to be transmitted from a transmission source and concurrently unacknowledged, where "unacknowledged" refers to a number of packets that have been sent but for which corresponding acknowledgments have not yet been received from the data destination source. For example, if the transmission window size is fifty packets, the transmission source will not transmit any further packets if fifty packets have been sent without the transmission source receiving corresponding acknowledgments. In response to receiving each data packet in a data stream, the transmission destination prepares an acknowledgment that includes a congestion indicator indicating whether or not the associated data packet encountered congestion. For example, the congestion may be identified at the data destination based on an elapsed time between a timestamp of data transmission and a timestamp of data receipt.

Some existing systems provide for dynamically modifying the size of a transmission window based on congestion data included in data packet acknowledgments received by a transmission source in association with a given data stream. For example, the transmission source reduces a size of the transmission window of the stream by a defined number of packets or by a fraction of the existing transmission window to reduce the number of packets of the stream in transit (effectively reducing the transmission rate), thereby mitigating or eliminating the congestion. Likewise, the transmission source may be configured to modify the transmission window in the opposite direction in response to receiving a number of (e.g., consecutive) acknowledgments without indications of congestion, such as by increasing the size of the transmission window by a number of packets or by a fraction of the existing transmission window to allow for greater transmission output in the uncongested network. Another way to control the number of packets transmitted by the transmission source is to throttle the rate at which data is transmitted from the transmission source, but this approach is not the subject of this specification.

In many of the above types of systems, network congestion control systems reduce transmission window sizes in response to detecting high levels of congestion using larger and more aggressive increments than the corresponding increments applied to reduce the transmission window size when comparatively low levels of congestion are detected in the network. For example, some congestion control systems use additive increase multiplicative decrease (AIMD) algorithms to increase the transmission window by a set number of packets in times of low congestion and decrease the transmission window by a fraction of the transmission window in times of high congestion (e.g., cutting the transmission window size in half). This approach desirably provides a quick response to congestion by significantly reducing window size in response to the congestion. However, this approach of reductions in window size that are more aggressive than increases in window size also results in unwanted oscillatory swings in the feedback response, which causes dramatic increases and decreases in the transmission window size over a short period. Dramatic increases in window size can undesirably cause the transmission source to transmit too many packets and effectively worsen network congestion at the transmission destination (or even drop packets); in contrast, dramatic decreases in the transmission window size can undesirably create congestion at the transmission source and impart latencies on outgoing traffic.

In addition, existing approaches to traffic congestion mitigation typically implement shifts in the transmission window size that rely on complex computations, including generation of an exponential weighted average of a pre-defined number of acknowledgments received. The complex computations occupy significant computational resources.

The presently disclosed technology provides a per-packet network congestion control system that determines, upon receipt of each acknowledgment (e.g., responsive to each packet received at a transmission destination), whether to resize a transmission window to account for the level of network congestion between the transmission source and the transmission destination. In implementations, the transmission source operates one or more window resize counters to determine, based on the number of received packets with or without indications of congestion, whether to resize the transmission window. Depending on the values of the counter, the system determines, upon receipt of each acknowledgment, whether to resize the transmission window.

In contrast to existing approaches to congestion mitigation, the disclosed technology provides for resizing the transmission window by a single packet at any given time. Resizing the transmission window by one packet at a time mitigates or prevents oscillatory behavior observed in systems that resize the transmission window by a set fraction (e.g., 50% or 25%) each time a congestion threshold is satisfied. In one implementation, the transmission window size is adjusted dynamically based on values tracked by window resize counters, such as a window increase counter or a window decrease counter. For example, a window increase counter increments each time a packet is received without a congestion indicator, and a window decrease counter increments each time a packet is received with a congestion indicator. The use of counters, as opposed to running averages, facilitates dynamic adjustments that are performed at a finer granular level than those implemented in existing congestion mitigation systems. This finer granularity of adjustment is due, in part, to the modifiability of the transmission window size in the disclosed systems in response to individually received acknowledgments or short sequences of consecutively received acknowledgments (e.g., three in a row indicating congestion) rather than on running averages of congestion information observed in association large groups of packets. Also, the use of window resize counters and comparisons with thresholds simplifies the determination of when to resize the transmission window, requiring fewer computational resources than existing systems that rely on complex computations.

Further, by applying different thresholds at which to modify transmission window size, the disclosed systems mimic AIMD algorithms at a larger scale (e.g., over the time of a transmission window), despite the fact that actual modifications to the transmission window size are small and more frequent. This facilitates the realization of some of the same benefits as AIMD algorithms while allowing the transmission window size to converge more quickly (e.g., as a result of more frequent granular adjustments as opposed to large oscillations in the transmission window size), providing a solution that is more stable and reliable and therefore better suited for implementation in conjunction with some newer data transport protocols.

FIG. 1 illustrates an example system 100 for controlling network congestion. The system 100 includes a transmission source 102 configured to transmit data in packets from the transmission source 102, over a network 106 (e.g., the cloud), to a transmission destination 104.

The packet includes a payload portion including the data to be transmitted and a header including information that describes the data to be transmitted or the manner in which the data to be transmitted is to be processed. Upon receiving a transmitted packet, the transmission destination 104 transmits a corresponding acknowledgment (e.g., a packet transmission acknowledgment) to the transmission source 102 that the packet has been received. A data flow encompasses the collection of packets and corresponding packet acknowledgments associated with a data stream 112 (e.g., on behalf of a same user or requesting process). In various implementations, the packets of the data stream 112 take either the same path or different respective paths through the network 106.

When the packet is transmitted over the network 106, the packet may experience congestion. For example, routers in the network 106 experience congestion by having more packets in the queue than the routers are able to route in real time, and the queue of packets builds up. If the transmission source 102 continues to transmit packets in a time of congestion, as if there is no congestion, the congestion worsens.

In an implementation, for every single packet received at the transmission destination 104, the transmission destination transmits a single corresponding acknowledgment. This acknowledgment includes a congestion indicator, which can be understood as being a single-bit flag or other data type indicating whether or not the associated data packet encountered congestion in excess of a set threshold when en route to the transmission destination 104. In implementations, the congestion indicator may indicate a quantified metric of congestion to allow the transmission source to determine whether the congestion threshold is exceeded.

To control congestion in the network 106, the transmission source 102 implements logic to dynamically resize a transmission window for the data stream 112 in response to fluctuations in the degree of congestion observed in the network. As described above, transmission window of the transmission source 102 represents the number of packets transmitted from the transmission source 102 that are allowed to be outstanding (e.g., packets transmitted but unacknowledged) at a given point in association with the data flow between the transmission source 102 and the transmission destination 104. When the number of outstanding packets reaches the transmission window size, the transmission source 102 stops transmitting packets and waits until additional acknowledgment(s) are received for some of the outstanding packets. When the remaining number of outstanding packets is again less than the transmission window size, the transmission source 102 again begins transmitting additional packets of the data flow.

Effectively, the size of the transmission window limits the number of packets from the transmission source 102 that can be outstanding at any given time. Modifying the size of the transmission window effectively modifies the data transmission rate, which, in turn, modifies the load that the data stream 112 places on the network.

When the network 106 is experiencing a low level of congestion (e.g., below a set threshold), this generally indicates that the size of the transmission window is safely expandable to better utilize the available network resources. In contrast, when the network 106 is experiencing a higher level of congestion (e.g., in excess of the set threshold), performance benefits can be realized by decreasing the size of the transmission window.

In an implementation, a network traffic monitor 108 of the transmission destination 104 or of the network 106 determines whether a packet experienced network congestion by determining whether the transmission of the packet satisfied a congestion condition. The congestion condition may be based on congestion metrics, such as error messages received, dropped packets, transmission time (e.g., the time the packet took to travel from the transmission source to the destination), packet queues in routers within the network 106, or repeated transmissions of packets. The condition may include a threshold value of, a predefined range of, rules for, or a decision tree based on the congestion metrics.

Responsive to a transmitted packet experiencing congestion during a transmission that satisfies the congestion condition, a network traffic monitor 108 instructs the transmission destination to transmit a responsive acknowledgment with a congestion indicator indicating that the packet experienced congestion during transmission. In various implementations, the congestion indicator assumes various forms, such as that of a single-bit flag or another data type indicative of congestion or lack thereof. In existing systems, the term "explicit congestion notification (ECN)" is commonly used to refer to a congestion indicator included in a packet acknowledgment that indicates satisfaction of a congestion condition.

Upon receipt of each acknowledgment, a window size manager 114 of the transmission source 102 uses a current count value of one of the window resize counters 110 to determine whether to resize a transmission window for the data stream 112. The window resize counters 110 include one or both of a window increase counter or a window decrease counter. For example, the window increase counter can be configured to increment each time an acknowledgment is received by the transmission source 102 with a congestion indicator that indicates the corresponding packet did not experience congestion. In response to determining that a window increase counter satisfies a predefined window resize condition, the window size manager 114 expands the transmission window (e.g., to include more packets). In implementations, the window increase counter is reset (e.g., to zero) each time an acknowledgment with an indication of congestion is received.

In one implementation, the window resize counters 110 include a window decrease counter that is configured to increment each time an acknowledgment is received by the transmission source 102 with a congestion indicator indicating the corresponding packet experienced congestion. In response to determining that a count value of the window decrease counter satisfies a predefined window resize condition, the window size manager 114 reduces the transmission window (e.g., to include fewer packets).

The window size manager 114 determines whether to resize the transmission window based on whether a count value of one of the window resize counters 110 satisfies a predefined window resize condition. For example, the count value satisfies the window resize condition responsive to the count value satisfying or exceeding a predefined threshold. In various implementations, the predefined threshold is predefined to be static or dynamic. For example, the predefined threshold is based on the current size (e.g., in transmission packets) of the transmission window, which is dynamically resized. In implementations, the threshold is based on a value of one of the window resize counters 110 relative to a proportion of the current transmission window. For example, the threshold includes a fraction representing the size of the transmission window divided by the value of the window resize counter. An implementation of pseudocode for implementing the window size manager 114 is presented herein in Exhibit 1.

In an implementation, the window size manager 114 determines whether to resize the transmission window on a per-acknowledgment basis. That is, the system 100 determines whether to resize (e.g., increase or decrease) the transmission window every time an acknowledgment (corresponding to a successfully transmitted packet) is received. This approach mitigates oscillatory behavior in the transmission window size that occurs in systems that base window resize conditions on trends observed with respect to groups of received acknowledgments (e.g., running averages).

Figure 2:
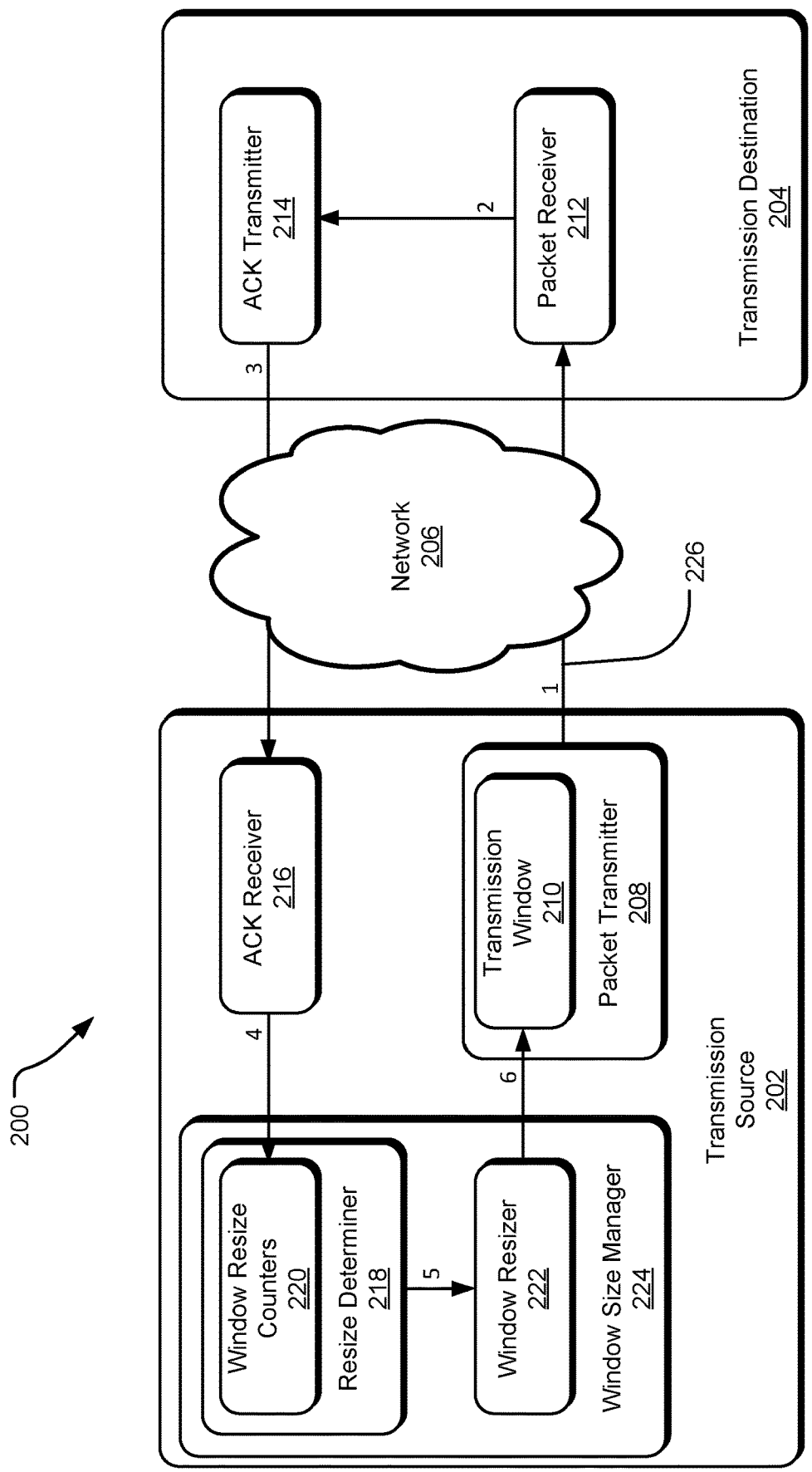
FIG. 2 illustrates another example system for controlling network congestion.

FIG. 2 illustrates another example system 200 for controlling network congestion. The system 200 includes a transmission source 202, including a packet transmitter 208 that transmits a data stream of packets over a network 206 (e.g., the cloud) to a transmission destination 204. The packet transmitter 208 implements logic ensuring that a number of outstanding (e.g., transmitted and unacknowledged) packets does not exceed a transmission window size.

The size of the transmission window 210 of a stream from the transmission source 202 represents the number of packets transmitted from the transmission source 202 that are allowed to be outstanding in the network (e.g., without the transmission source 202 having received corresponding responsive acknowledgments) at a given time. Responsive to the number of outstanding packets reaching the transmission window 210 amount, the transmission source 202 waits to transmit further packets until an acknowledgment from the transmission destination 204 corresponding to an outstanding packet is received by the transmission source 202. The transmission window 210 limits the number of outstanding packets from the transmission source 202 at any given time. Modifying the transmission window 210 modifies the load that the packets transmitted from the transmission source 202 exert on the network 206. If the network 206 is uncongested, the transmission window 210 can be expanded to utilize the available network resources in the network 206. If the network 206 is congested, the transmission window 210 can be reduced to mitigate or eliminate the congestion.

Arrows in FIG. 2 are denoted with numbers 1-6 to indicate an order of communications described below. In communication 1, the packet transmitter 208 transmits a packet over the network 206 as part of a data flow 226 to a packet receiver 212 in the transmission destination 204. The data flow 226 may be understood as including one or more routes for the respective data packets in the flow. In communication 2, an acknowledgment transmitter 214 receives a notification from the packet receiver 212 indicating that the packet has been received. The acknowledgment transmitter 214 determines, based on data provided by the network, the packet receiver, or other elements of the transmission destination 204, whether one or more congestion criteria are satisfied for the data packet. Satisfaction of the congestion criteria (e.g., a congestion condition or multiple conditions) generally indicates the packet experienced a higher-than-nominal level of congestion in the network 206 while in transit between the transmission source 202 and the transmission destination 204.

The acknowledgment transmitter 214 generates an acknowledgment for each received data packet. Each acknowledgment includes a congestion indicator that either indicates "congestion" (e.g., when the congestion criteria are deemed satisfied for the data packet) or a lack of congestion—"no congestion" (e.g., when the congestion criteria are not satisfied for the data packet).

In communication 3, the acknowledgment transmitter 214 transmits the acknowledgment with the congestion indicator to the transmission source 202. The acknowledgment is received by an acknowledgment receiver 216 in the transmission source 202. In communication 4, the acknowledgment receiver 216 provides a window resizer 222 with congestion data (e.g., the status of the congestion indicator for the data packet that either indicates congestion or no congestion). This status is used to modify (e.g., increment or decrement) a count value stored by window resize counters 220.

Based at least in part on the count value stored by the window resize counters 220, the resize determiner 218 determines whether to resize the transmission window 210. In one implementation, the window resize counters 220 include a window increase counter and a window decrease counter. The window increase counter is incremented each time congestion data indicates that the last acknowledgment did not include a congestion indicator indicating congestion, and the window decrease counter is incremented each time congestion data indicates that the last acknowledgment includes a congestion indicator indicating no congestion (e.g., the corresponding packet did not experience a predefined level of congestion). In some implementations, the window increase counter is reset to zero each time an acknowledgment is received with a congestion indicator indicating that the corresponding packet did not experience congestion.

In an implementation, each time an acknowledgment is received, at the acknowledgment receiver, the resize determiner 218 executes window resize logic to assess whether or not the transmission window 210 should be resized. For example, the window resize logic may assess whether or not a current count value of one of the window resize counters 220 (e.g., the window increase counter or the window decrease counter) satisfies a window resize condition, as described herein.

When the resize determiner 218 determines, based on a count value of one or more of the window resize counters 220, that the transmission window 210 should be resized, the resize determiner 218 instructs a window resizer 222 of the window size manager 224 to resize the transmission window 210 in communication 5. In communication 6, the window resizer 222 resizes the transmission window 210. In implementations, the window resizer 222 resizes the transmission window 210 by one packet each time the transmission window 210 is resized. In an implementation, the window resizer 222 effectively implements an AIMD algorithm for modifying the size of the transmission window 210 over a transmission window's worth of received acknowledgments (or corresponding successfully transmitted packets), as disclosed herein. In an implementation, the resize determiner 218 implements operations outlined in the pseudocode (e.g., lines 18 and 22) of the Example Pseudocode in Exhibit 1.

Example pseudocode for implementing features of the system 200 is presented in Exhibit 1. Lines 1-6 of the pseudocode initialize variables and constants. Constant "A" is a window increase constant, constant "E" is a window decrease constant, variable "Cwnd" is a transmission window size, constant "BDP" is an initial transmission window size, variable "Ci" is a window increase counter, variable "Cd" is a window decrease counter, and variable "Cip" is the number of outstanding packets in transmission between the transmission source 202 and the transmission destination 204. The window increase counter (Ci) and the window decrease counter (Cd) are implementations of the window resize counters 220. Lines 7-8 invoke a process for controlling congestion. Lines 10-11 indicate that, responsive to a packet being transmitted from the transmission source 202, the number of outstanding packets (Cip) is incremented.

Lines 12-25 are executed by the window size manager 224 in response to receiving each acknowledgment of the data flow 226. In line 13, responsive to an acknowledgment being received, the number of outstanding packets (Cip) is decremented. Lines 14-19 are invoked responsive to receiving an acknowledgment, including a congestion indicator indicating congestion (e.g., the corresponding packet experience network congestion in satisfaction of a congestion condition). In line 15, the window decrease counter (Cd) is incremented. In line 16, the window increase counter (Ci) is reset to zero. In line 17, the resize determiner 218 determines whether the window decrease counter (Cd) is greater than the window decrease constant (E) in satisfaction of a window resize condition (e.g., a window decrease condition). In this example, the window resize condition is based on the value of the decrease counter (Cd) satisfying or exceeding a predefined threshold. In various implementations, the predefined threshold is predefined to be static or dynamic. Responsive to the satisfaction of the window resize condition, the window resizer 222 reduces the transmission window size (Cwnd) by one packet (unless the transmission window size is already zero, in which case the transmission window size remains zero) in line 18.

| Exhibit 1: Example Pseudocode |
|---|
| 1.     A=1; |
| 2.     E=2; |
| 3.     Cwnd = BDP |
| 4.     Ci = 0 |
| 5.     Cd = 0 |
| 6.     Cip = 0 |
| 7.     Void Dcqcn: :process (std: : chrono: :nanoseconds now, State state, |
| 8.     bool cnp, std: :size_t byte_count) { |
| 9.       switch (State) { |
| 10.         case State: :Datasend: { |
| 11.           Cip +=1; } |
| 12.         case State: :AckRecv: { |
| 13.           Cip −=1; |
| 14.           if (cnp) { |
| 15.             Cd += 1; |
| 16.             Ci = 0 |
| 17.             if (CD > E) { |
| 18.               Cwnd = max (0, Cwnd−1) } } |
| 19.           else { |
| 20.             Ci +=1 |
| 21.             if (Ci > Cwnd/A) { |
| 22.               Cwnd = min (Cmax, Cwnd+1); |
| 23.               Ci = 0; }}}} |
| 24.       window_exceeded = Cip > Cwnd }) |

In the above pseudocode example, Lines 19-23 are invoked responsive to processing the congestion indicator in the received acknowledgment indicating that the corresponding packet did not experience congestion. In line 20, the window increase counter (Ci) is incremented. In line 21, the resize determiner 218 compares the window increase counter (Ci) with a threshold (e.g., to determine satisfaction of a window increase condition) based on the transmission window size (Cwnd) and the window increase constant (A). In the example, the window resize condition is based on whether the window increase counter (Ci) is greater than a fraction with the transmission window size (Cwnd) in the numerator and the window increase constant (A) in the denominator. Responsive to the resize determiner 218 determining that the window resize condition (e.g., the threshold) is satisfied, the window resizer 222 increments the transmission window size (Cwnd) (unless a maximum window size has been reached, in which case the transmission window size remains the maximum).

As provided in the pseudocode, the window decrease counter (Cd) is directly compared with the window decrease constant (E). While the window is only reduced by one packet in response to the satisfaction of the window decrease condition, over the course of a transmission window's worth of consecutively received acknowledgments with congestion indicators (or corresponding successfully transmitted packets) indicating that the corresponding packets experienced congestion, the transmission window is effectively reduced by a fraction based on the decrease constant (E). The new transmission window over the course of a window size's worth of consecutive acknowledgments, including congestion indicators, indicating congestion is expressable by equation (1):

$$WindowSizeNew = WindowSizeOld * \left(1 - \frac{1}{E}\right), \quad (1)$$

where "WindowSizeNew" is the new transmission window size, variable "WindowSizeOld" is the previous transmission window size (prior to the window size's worth of consecutive acknowledgments), and constant "E" is the window decrease constant. In effect, over a transmission window's worth of consecutive acknowledgments indicating congestion, the system 200 implements a multiplicative decrease in transmission window size.

On the other hand, the window increase counter (Ci) is compared to a fraction with the window fraction with the transmission window size (Cwnd) in the numerator and the window increase constant (A) in the denominator. While the transmission window is only expanded by one packet in response to the satisfaction of the window increase condition (A), over the course of a transmission window's worth of consecutively received acknowledgments, congestion indicators (or corresponding successfully transmitted packets) indicating no congestion, the transmission window is effectively expanded by a constant number of packets based on the window increase constant (A). The new transmission window over the course of a window size's worth of consecutive acknowledgments indicating no congestion is expressable by equation (2):

$$WindowSizeNew = WindowSizeOld + A, \quad (2)$$

where "WindowSizeNew" is the new transmission window size, variable "WindowSizeOld" is the previous transmission window size (prior to the window size's worth of consecutive acknowledgments), and constant "A" is the window increase constant. In effect, over a transmission window's worth of consecutive acknowledgments indicating no congestion, the system 200 implements an additive increase in transmission window size.

Accordingly, in the implementation of the pseudocode, despite each transmission window resize being by only one packet, over a transmission window's worth of consecutive acknowledgments (or corresponding successfully transmitted packets) with congestion indicators indicating congestion or a transmission window's worth of consecutive acknowledgments with congestion indicators indicating no congestion, the system 200 effectively implements an additive increase multiplicative decrease (AIMD) algorithm to resize the window. Line 24 merely indicates that a present number of outstanding packets transmitted by the transmission source 202 exceeds the current transmission window size. This returned parameter is usable to temporarily prevent the transmission source 202 from transmitting further packets until the number of packets outstanding in the network 206 matches the transmission window size.

The pseudocode presented is merely an example of the manner in which the system 200 determines whether to resize the transmission window based on the window resize counters 220 and an example of a manner in which the system 200 determines whether to resize the transmission window at the receipt of each acknowledgment.

Figure 3:
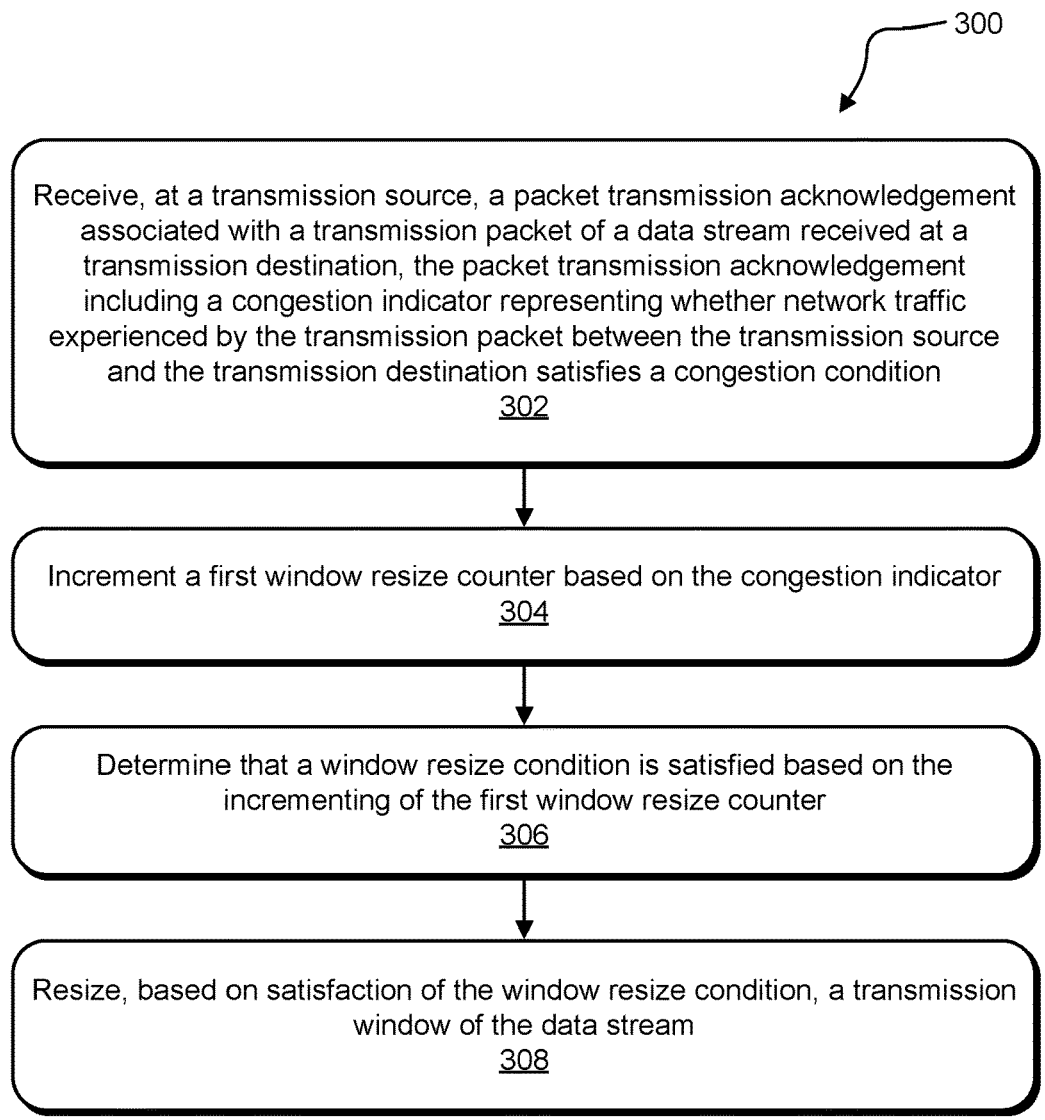
FIG. 3 illustrates example operations for controlling network congestion.

FIG. 3 illustrates example operations 300 for controlling network congestion. A receiving operation 302 receives, at the transmission source, a packet transmission acknowledgment associated with a transmission packet of a data stream received at a transmission destination. The packet transmission acknowledgment includes a congestion indicator representing whether network traffic experienced by the transmission packet between the transmission source and the transmission destination satisfies a congestion condition. The satisfaction of the congestion condition is determined as described herein.

An incrementing operation 304 increments a first window resize counter based on the congestion indicator. Window resize counters include a window increase counter or a window decrease counter. A window increase counter is incremented responsive to receiving a congestion indicator indicating no congestion in the network. A window decrease counter is incremented responsive to receiving a congestion indicator indicating congestion in the network. In an implementation, the window increase counter is reset to zero, responsive to receiving a congestion indicator indicating congestion in the network.

A determining operation 306 determines that a window resize condition is satisfied based on the incrementing of the first window resize counter. The window resize condition is based on a comparison of the window resize counter with a threshold value, as described herein. The threshold value is predefined to be static or dynamic. The determining operation 306 is conducted upon receipt of each acknowledgment (corresponding to a successfully transmitted packet) at the transmission source. The determining operation 306 further determines whether the window resize condition is satisfied or unsatisfied upon receipt of each acknowledgment corresponding to a successfully transmitted packet.

A resizing operation 308 resizes, based on satisfaction of the window resize condition, a transmission window of the data stream. The resizing operation 308 resizes the transmission window by modifying the number of packets in the transmission window (e.g., the number of packets allowed to be outstanding in the network at a given time). In implementations, the resizing operation 308 modifies the size of the transmission window by one packet at a time to mitigate oscillatory behavior in the window size caused by the control feedback loop. In an implementation, the resize condition of the determining operation 306 is based on the present transmission window size prior to resizing.

Figure 4:
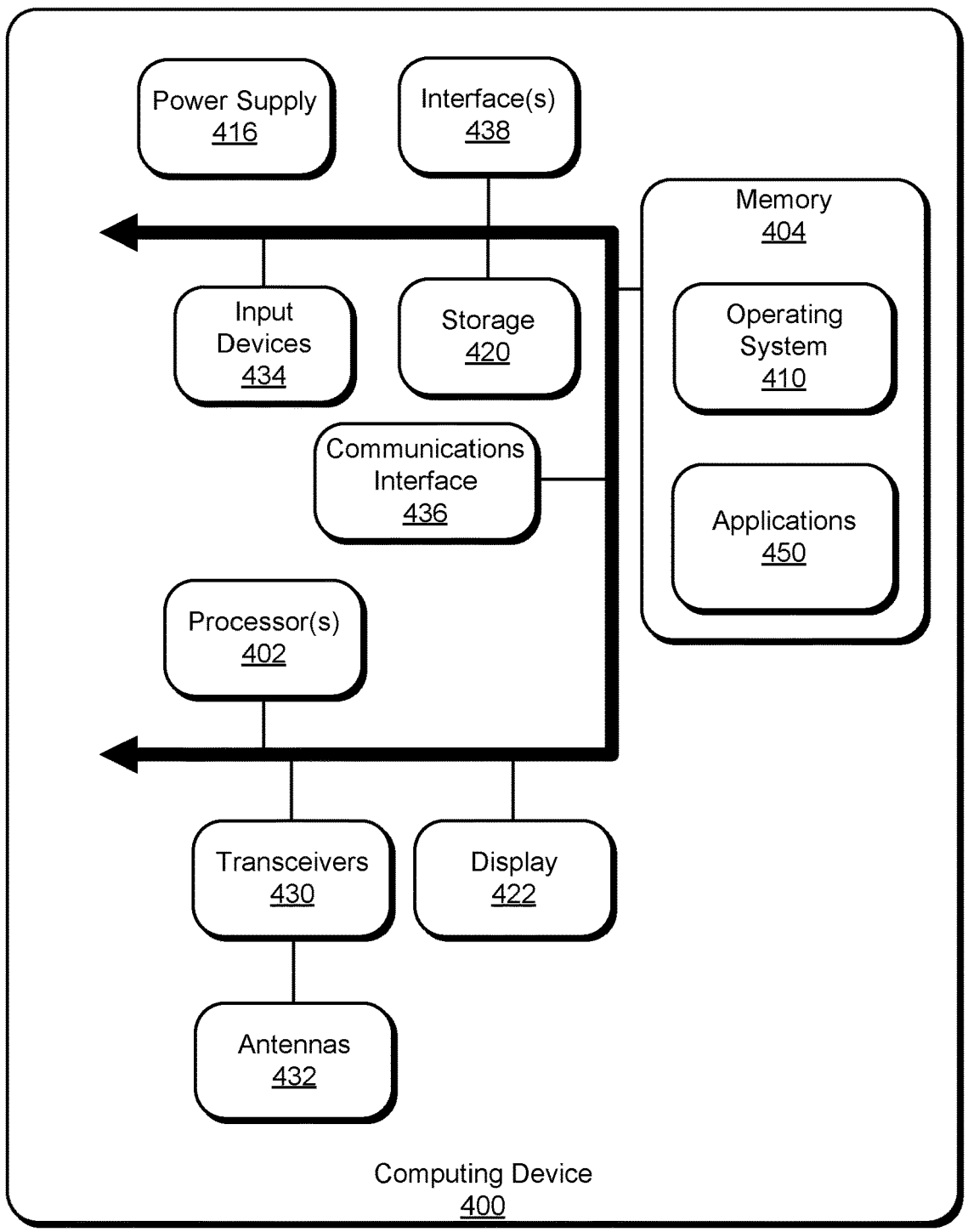
FIG. 4 illustrates an example computing device for use in implementing the described technology.

FIG. 4 illustrates an example computing device 400 for use in implementing the described technology. The computing device 400 may be a client computing device (such as a laptop computer, a desktop computer, or a tablet computer), a server/cloud computing device, an Internet-of-Things (IoT), any other type of computing device, or a combination of these options. The computing device 400 includes one or more processor(s) 402 and a memory 404. The memory 404 generally includes both volatile memory (e.g., RAM) and nonvolatile memory (e.g., flash memory), although one or the other type of memory may be omitted. An operating system 410 resides in the memory 404 and is executed by the processor(s) 402. In some implementations, the computing device 400 includes and/or is communicatively coupled to storage 420.

In the example computing device 400, as shown in FIG. 4, one or more modules or segments, such as applications 450, a transmission window, a packet transmitter, a packet receiver, an acknowledgment transmitter, and acknowledgment receiver, a resize determiner, a window resize counter, a window increase counter, a window decrease counter, and other program code and modules are loaded into the operating system 410 on the memory 404 and/or the storage 420 and executed by the processor(s) 402. The storage 420 may store a window resize counter, a window increase counter, a window decrease counter, a transmission window, a congestion condition, a congestion indicator, congestion data, a congestion metric, a window resize condition, a window increase constant, a window decrease constant, a transmission window size, an initial transmission window size, a number of outstanding packets, and other data and be local to the computing device 400 or may be remote and communicatively connected to the computing device 400. In particular, in one implementation, components of a system for control of congestion in a network between a transmission source and a transmission destination. The system may be configured to receive, at the transmission source, a packet transmission acknowledgment transmitted responsive to a transmission packet being received at the transmission destination, increment a first window resize counter based on a congestion indicator, determine that a window resize condition is satisfied based on the incrementing of the first window resize counter and resize, based on satisfaction of the window resize condition, a transmission window of the transmission source. The packet transmission acknowledgment includes the congestion indicator, which represents whether network traffic experienced by the transmission packet between the transmission source and the transmission destination satisfies a congestion condition. The system may be implemented entirely in hardware or in a combination of hardware circuitry and software.

The computing device 400 includes a power supply 416, which may include or be connected to one or more batteries or other power sources, and which provides power to other components of the computing device 400. The power supply 416 may also be connected to an external power source that overrides or recharges the built-in batteries or other power sources.

The computing device 400 may include one or more communication transceivers 430, which may be connected to one or more antenna(s) 432 to provide network connectivity (e.g., mobile phone network, Wi-Fi®, Bluetooth®) to one or more other servers, client devices, IoT devices, and other computing and communications devices. The computing device 400 may further include a communications interface 436 (such as a network adapter or an I/O port, which are types of communication devices). The computing device 400 may use the adapter and any other types of communication devices for establishing connections over a wide-area network (WAN) or local-area network (LAN). It should be appreciated that the network connections shown are exemplary and that other communications devices and means for establishing a communications link between the computing device 400 and other devices may be used.

The computing device 400 may include one or more input devices 434 such that a user may enter commands and information (e.g., a keyboard, trackpad, or mouse). These and other input devices may be coupled to the server by one or more interfaces 438, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 400 may further include a display 422, such as a touchscreen display.

The computing device 400 may include a variety of tangible processor-readable storage media and intangible processor-readable communication signals. Tangible processor-readable storage can be embodied by any available media that can be accessed by the computing device 400 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 400. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more signal characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of controlling congestion in a network between a transmission source and a transmission destination, the method comprising: receiving, at the transmission source, a packet transmission acknowledgment associated with a transmission packet of a data stream received at the transmission destination, the packet transmission acknowledgment including a congestion indicator representing whether network traffic experienced by the transmission packet between the transmission source and the transmission destination satisfies a congestion condition; incrementing a first window resize counter based on the congestion indicator; determining that a window resize condition is satisfied based on the incrementing of the first window resize counter; and resizing, based on satisfaction of the window resize condition, a transmission window of the data stream. The transmission window represents a maximum number of packets permitted to be transmitted from the transmission source and concurrently unacknowledged as received by the transmission destination.

Clause 2. The method of clause 1, wherein the congestion indicator indicates the network traffic experienced by the transmission packet between the transmission source and the transmission destination satisfies a congestion condition, and the resizing reduces the transmission window.

Clause 3. The method of clause 2, further comprising: setting a second window resize counter to zero, wherein the second window resize counter represents a number of consecutive packet transmission acknowledgments with congestion indicators indicating the congestion condition is unsatisfied.

Clause 4. The method of clause 1, wherein the congestion indicator indicates traffic between the transmission source and the transmission destination fails to satisfy a congestion condition, and the resizing expands the transmission window.

Clause 5. The method of clause 1, wherein the resizing modifies a number of transmission packets in the transmission window.

Clause 6. The method of clause 1, wherein the resizing adjusts the size of the transmission window by one transmission packet at a time.

Clause 7. The method of clause 1, wherein the window resize condition is based on a size of the transmission window prior to the resizing.

Clause 8. The method of clause 1, wherein the determining is conducted upon receipt of each transmission packet acknowledgment at the transmission source.

Clause 9. A system of controlling congestion in a network between a transmission source and a transmission destination, the system comprising: one or more hardware processors; an acknowledgment receiver executable by the one or more hardware processors and configured to receive, at the transmission source, a packet transmission acknowledgment associated with a transmission packet of a data stream received at the transmission destination, the packet transmission acknowledgment including a congestion indicator representing whether network traffic experienced by the transmission packet between the transmission source and the transmission destination satisfies a congestion condition; a window resize counter executable by the one or more hardware processors and configured to increment based on the congestion indicator; a resize determiner executable by the one or more hardware processors and configured to determine that a window resize condition is satisfied based on the incrementing of the window resize counter and to determine whether a window resize condition is satisfied upon receipt of each acknowledgment corresponding to a transmitted packet; and a window resizer executable by the one or more hardware processors and configured to resize, based on satisfaction of the window resize condition, a transmission window of the data stream.

Clause 10. The system of clause 9, wherein the congestion indicator indicates the network traffic experienced by the transmission packet between the transmission source and the transmission destination satisfies a congestion condition, and the window resizer conducts the resizing of the transmission window by reducing the transmission window.

Clause 11. The system of clause 9, wherein the congestion indicator indicates traffic between the transmission source and the transmission destination fails to satisfy a congestion condition, and the window resizer conducts the resizing of the transmission window by expanding the transmission window.

Clause 12. The system of clause 9, wherein the window resizer is configured to conduct the resizing of the transmission window by modifying a number of transmission packets in the transmission window.

Clause 13. The system of clause 9, wherein the resize determiner conducts the determination of the satisfaction of the window resize condition by comparing the window resize counter with a predefined resize counter threshold.

Clause 14. The system of clause 9, wherein the window resizer conducts the resizing of the transmission window by one transmission packet at a time.

Clause 15. One or more tangible processor-readable storage media embodied with instructions for executing on one or more processors and circuits of a computing device a process for controlling network congestion, the process comprising: receiving, at a transmission source, a packet transmission acknowledgment associated with a transmission packet of a data stream received at a transmission destination, the packet transmission acknowledgment including a congestion indicator representing whether network traffic experienced by the transmission packet between the transmission source and the transmission destination satisfies a congestion condition; incrementing a first window resize counter based on the congestion indicator; determining that a window resize condition is satisfied based on the incrementing of the first window resize counter, the determining including comparing the window resize counter with a predefined resize counter threshold; and resizing, based on satisfaction of the window resize condition, a transmission window of the data stream.

Clause 16. The one or more tangible processor-readable storage media of clause 15, wherein the congestion indicator indicates the network traffic experienced by the transmission packet between the transmission source and the transmission destination satisfies a congestion condition, and the resizing reduces the transmission window.

Clause 17. The one or more tangible processor-readable storage media of clause 15, wherein the congestion indicator indicates traffic between the transmission source and the transmission destination fails to satisfy a congestion condition, and the resizing expands the transmission window.

Clause 18. The one or more tangible processor-readable storage media of clause 15, wherein the resizing modifies a number of transmission packets in the transmission window.

Clause 19. The one or more tangible processor-readable storage media of clause 15, wherein the resizing operation adjusts the size of the transmission window by one transmission packet at a time.

Clause 20. The one or more tangible processor-readable storage media of clause 15, wherein the determining is conducted upon receipt of each transmission packet acknowledgment at the transmission source.

An example system of controlling congestion in a network between a transmission source and a transmission destination is provided. The system includes: means for receiving, at the transmission source, a packet transmission acknowledgment associated with a transmission packet of a data stream received at the transmission destination, the packet transmission acknowledgment including a congestion indicator representing whether network traffic experienced by the transmission packet between the transmission source and the transmission destination satisfies a congestion condition; means for incrementing a first window resize counter based on the congestion indicator; means for determining that a window resize condition is satisfied based on the incrementing of the first window resize counter and means for resizing, based on satisfaction of the window resize condition, a transmission window of the data stream.

Another example system of any disclosed system is provided, wherein the congestion indicator indicates the network traffic experienced by the transmission packet between the transmission source and the transmission destination satisfies a congestion condition, and the means for resizing reduces the transmission window.

Another example system of any disclosed system is provided, further including means for setting a second window resize counter to zero, wherein the second window resize counter represents a number of consecutive packet transmission acknowledgments with congestion indicators indicating the congestion condition is unsatisfied.

Another example system of any disclosed system is provided, wherein the congestion indicator indicates traffic between the transmission source and the transmission destination fails to satisfy a congestion condition, and the means for resizing expand the transmission window.

Another example system of any disclosed system is provided, wherein the means for resizing modifies a number of transmission packets in the transmission window.

Another example system of any disclosed system is provided, wherein the means for resizing resize the transmission window by one transmission packet at a time.

Another example system of any disclosed system is provided, wherein the window resize condition is based on a size of the transmission window prior to the resizing.

In implementations, a threshold for determining the satisfaction of a window resize condition is based on a window resize counter value relative to a proportion of the current transmission window. For example, the threshold includes a fraction representing the size of the transmission window divided by the value of the window resize counter. An implementation of pseudocode that includes a resize condition based on a size of the transmission window is presented herein in Exhibit 1.

Another example system of any disclosed system is provided, wherein the means for determining determines that the window resize condition is satisfied upon receipt of each transmission packet acknowledgment at the transmission source.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type(s) of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method of controlling congestion in a network between a transmission source and a transmission destination, the method comprising:

receiving, at the transmission source, a consecutive series of packet transmission acknowledgements associated with different transmission packets of a data stream received at the transmission destination, each the packet transmission acknowledgment in the consecutive series of packet transmission acknowledgements including a congestion indicator representing whether network traffic experienced by a corresponding transmission packet between the transmission source and the transmission destination satisfies a congestion condition;

in response to receiving each packet transmission acknowledgement of the consecutive series of packet transmission acknowledgements:

selectively incrementing a select one of two different window resize counters based on a value of the congestion indicator included in the packet transmission acknowledgement;
determining whether a window resize condition is satisfied based on the incrementing of the select one of the two different window resize counters; and
in response to determining that the window resize condition is satisfied, resizing a transmission window of the data stream, the transmission window representing a maximum number of packets permitted to be transmitted from the transmission source and concurrently unacknowledged as received by the transmission destination.

2. The method of claim 1, wherein the congestion indicator indicates the network traffic experienced by the transmission packet between the transmission source and the transmission destination satisfies a congestion condition, and the resizing reduces the transmission window.

3. The method of claim 2, further comprising:
setting a second window resize counter to zero, wherein the second window resize counter represents a number of consecutive packet transmission acknowledgments with congestion indicators indicating the congestion condition is unsatisfied.

4. The method of claim 1, wherein the congestion indicator indicates traffic between the transmission source and the transmission destination fails to satisfy a congestion condition, and the resizing expands the transmission window.

5. The method of claim 1, wherein the resizing modifies a number of transmission packets in the transmission window.

6. The method of claim 1, wherein the resizing operation adjusts the size of the transmission window by one transmission packet at a time.

7. The method of claim 1, wherein the window resize condition is based on a size of the transmission window prior to the resizing.

8. The method of claim 1, wherein the determining is conducted upon receipt of each transmission packet acknowledgment at the transmission source.

9. A system of controlling congestion in a network between a transmission source and a transmission destination, the system comprising:
one or more hardware processors;
an acknowledgment receiver executable by the one or more hardware processors and configured to receive, at the transmission source, a packet transmission acknowledgment associated with a transmission packet of a data stream received at the transmission destination, the packet transmission acknowledgment including a congestion indicator representing whether network traffic experienced by the transmission packet between the transmission source and the transmission destination satisfies a congestion condition;
a first window resize counter executable by the one or more hardware processors and configured to increment a first stored count value in response to the congestion indicator assuming a first value;
a second window resize counter executable by the one or more hardware processors and configured to increment a second stored count value in response to the congestion indicator assuming a second value;
a resize determiner executable by the one or more hardware processors and configured to:

determine, in response to receipt of each acknowledgement corresponding to a transmitted packet, whether a window resize condition is satisfied based on the first stored count value of the first window resize counter or the second stored count value of the second window resize counter;
a window resizer executable by the one or more hardware processors and configured to resize a transmission window of the data stream in response to determining that the window resize condition is satisfied.

10. The system of claim 9, wherein the congestion indicator indicates the network traffic experienced by the transmission packet between the transmission source and the transmission destination satisfies a congestion condition, and the window resizer conducts the resizing of the transmission window by reducing the transmission window.

11. The system of claim 9, wherein the congestion indicator indicates traffic between the transmission source and the transmission destination fails to satisfy a congestion condition, and the window resizer conducts the resizing of the transmission window by expanding the transmission window.

12. The system of claim 9, wherein the window resizer is configured to conduct the resizing of the transmission window by modifying a number of transmission packets in the transmission window.

13. The system of claim 9, wherein the resize determiner conducts the determination of the satisfaction of the window resize condition by comparing the window resize counter with a predefined resize counter threshold.

14. The system of claim 9, wherein the window resizer conducts the resizing of the transmission window by one transmission packet at a time.

15. One or more tangible processor-readable storage media embodied with instructions for executing on one or more processors and circuits of a computing device a process for controlling network congestion, the process comprising:
receiving, at a transmission source, a packet transmission acknowledgment associated with a transmission packet of a data stream received at a transmission destination, the packet transmission acknowledgment including a congestion indicator representing whether network traffic experienced by the transmission packet between the transmission source and the transmission destination satisfies a congestion condition;
selectively incrementing a select one of two different window resize counters based on a value of the congestion indicator;
determining whether a window resize condition is satisfied based on the incrementing of the select one of the two different window resize counters; and
in response to determining that the window resize condition is satisfied, resizing a transmission window of the data stream.

16. The one or more tangible processor-readable storage media of claim 15, wherein the congestion indicator indicates the network traffic experienced by the transmission packet between the transmission source and the transmission destination satisfies a congestion condition, and the resizing reduces the transmission window.

17. The one or more tangible processor-readable storage media of claim 15, wherein the congestion indicator indicates traffic between the transmission source and the transmission destination fails to satisfy a congestion condition, and the resizing expands the transmission window.

18. The one or more tangible processor-readable storage media of claim 15, wherein the resizing modifies a number of transmission packets in the transmission window.

19. The one or more tangible processor-readable storage media of claim 15, wherein the resizing operation adjusts the size of the transmission window by one transmission packet at a time.

20. The one or more tangible processor-readable storage media of claim 15, wherein the determining is conducted upon receipt of each transmission packet acknowledgment at the transmission source.

21. The method of claim 1, wherein the two different window resize counters include a window increase counter and a window decrease counter, and wherein the window decrease counter is incremented when the congestion indicator of a received packet transmission acknowledgement indicates satisfaction of a congestion condition, and wherein the window increase counter is incremented when the congestion indicator of the received packet transmission acknowledgement indicates the congestion condition is not satisfied.

22. The method of claim 21, wherein determining whether the window resize condition is satisfied further comprises:
determining whether a window decrease condition is satisfied by the window decrease counter; and
determining whether a window increase condition is satisfied by the window increase counter, wherein resizing the transmission window includes one of:
reducing the transmission window when the window decrease condition is satisfied; and
increasing the transmission window when the window increase condition is satisfied.

* * * * *